United States Patent [19]
Williams

[11] Patent Number: 5,947,354
[45] Date of Patent: Sep. 7, 1999

[54] CARRIER FOR VEHICLE ROOFS

[75] Inventor: Patrick Yelverton Williams, Clear Island Waters, Australia

[73] Assignee: Bradley Stewart Fraser, Queensland, Australia

[21] Appl. No.: 08/860,646

[22] PCT Filed: Feb. 6, 1997

[86] PCT No.: PCT/AU97/00061

§ 371 Date: May 23, 1997

§ 102(e) Date: May 23, 1997

[87] PCT Pub. No.: WO98/34813

PCT Pub. Date: Aug. 13, 1998

[51] Int. Cl.$^6$ .............................. B60R 9/045; B60R 9/04
[52] U.S. Cl. ...................... 224/318; 224/314; 224/324; 224/572
[58] Field of Search .................... 224/309, 311, 224/314, 318, 320, 322, 324, 325, 328, 572, 917.5; 5/706, 710, 711

[56] References Cited

U.S. PATENT DOCUMENTS

| | | |
|---|---|---|
| 2,409,946 | 10/1946 | MacLeod . |
| 2,465,268 | 3/1949 | Rogers et al. ............................. 5/711 |
| 2,983,413 | 5/1961 | Verwers .................................. 224/318 |
| 3,884,404 | 5/1975 | Frost ...................................... 224/318 |
| 4,101,062 | 7/1978 | Lazar ..................................... 224/314 |
| 4,117,963 | 10/1978 | Luczynski . |
| 4,226,354 | 10/1980 | Allen . |
| 4,793,535 | 12/1988 | Johnson . |

FOREIGN PATENT DOCUMENTS

| | | |
|---|---|---|
| 493424 | 3/1977 | Australia . |
| 40936/96 | 3/1997 | Australia . |
| 1116141 | 1/1982 | Canada ............................... 224/917.5 |
| 766722 | 4/1934 | France .................................. 224/318 |
| 762177 | 11/1956 | United Kingdom . |
| 920588 | 3/1963 | United Kingdom . |
| 84/04074 | 10/1984 | WIPO . |

*Primary Examiner*—Gregory M. Vidovich
*Attorney, Agent, or Firm*—Renner, Otto, Boisselle & Sklar, P.L.L.

[57] ABSTRACT

An inflatable roof carrier comprises a flexible member (10) having a pair of inflatable tubular portions (11) arranged on opposite sides of a central strip (12). Straps (16, 17) are connected to flaps (14, 15) at opposite ends of the flexible member (10). The load carrier is placed on the vehicle roof, and the straps (16, 17) are drawn around the opposite sides of the roof and into the vehicle. The free ends of straps (16, 17) are provided with mating connectors (19, 20) enabling the straps to be joined under the roof within the vehicle. The flaps (14, 15) are captured between the car doors and the vehicle roof when the doors are closed. The inflatable load carrier can be furled into compact form and stowed in the glovebox when not in use.

8 Claims, 2 Drawing Sheets

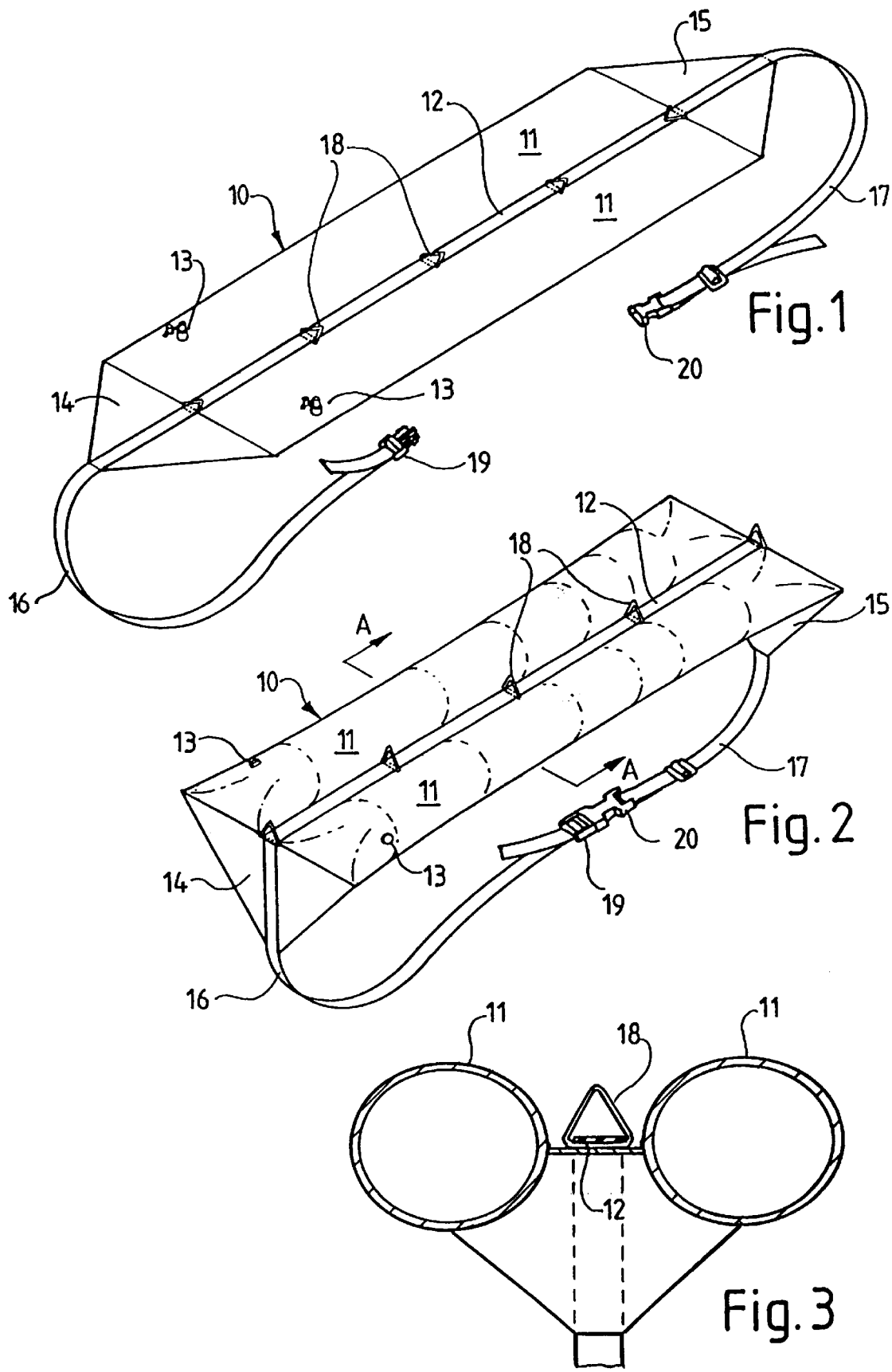

CARRIER FOR VEHICLE ROOFS

THIS INVENTION relates to a carrier for supporting a load on the roof of a vehicle. In particular, the invention is directed to an inflatable load carrier.

BACKGROUND ART

Load supports, commonly known as "roof racks", can be affixed to the roof of a vehicle to carry a load which may not fit within the vehicle. Such roof racks typically consist of spaced tubular metal bars spanning across the vehicle roof, and supported above the vehicle roof by posts whose feet are fixed to the rain gutters on either side of the vehicle roof.

In many modern cars, the rain gutters have been eliminated, and conventional roof racks are no longer suitable. Special roof racks are required for such modern vehicles. These roof racks are very expensive, and due to their bulky nature, require considerable storage space when not in use. Another major disadvantage of the latter type of roof rack is that it must be custom designed to suit each vehicle model and, in many cases, the front and rear racks are of different lengths.

Further, in many instances, holes must be drilled into the vehicle roof to enable mounting attachments for the roof racks to be fixed to the roof. Hence, the installation of the mounting attachments requires skilled labor.

Known metal roof racks are not entirely suitable for carrying fragile loads, such as glass sheets, unless an additional soft material, such as a sponge layer, is placed between the roof rack and the fragile load.

Australian patent no. 493424 discloses a roof carrier for one or more surfboards, the roof carrier having a solid, but compressible cylindrical support pad to protect the roof. However, the roof carrier of patent no. 493424 is designed for a specific type of load, and does not have general application. Furthermore, as it is secured to the raingutters, it is not suitable for recent models of vehicles. Another disadvantage of this known roof support is that it is easily stolen as it is fixed only to the exterior of the vehicle.

One particularly significant disadvantage of the roof rack of patent no. 493424 is that the solid support pad, although spongy, cannot be compressed to a compact form and the roof rack still requires considerable storage space when not in use. For example, the known roof rack cannot be stowed in the glovebox of a vehicle.

U.S. Pat. No. 2,409,946 discloses a luggage carrier for a vehicle roof, the carrier consisting of a pair of inflatable tubes, each of which are held on the vehicle roof by a strap connected to the upper surface of the tube. The ends of the strap are secured to the rain gutters of the vehicle.

Consequently, this luggage carrier is not suitable for modern vehicles which do not have rain gutters, and is prone to theft. Moreover, as the securing strap is not connected to the ends of the inflatable tube, but rather to the top of the tube, the tube has a tendency to roll if the vehicle stops suddenly, or accelerates quickly, particularly if the tube is carrying a load.

This invention provides an improved load carrier for use on a vehicle roof which overcomes or ameliorates one or more of the above disadvantages, or which at least provides the consumer with a useful choice.

SUMMARY OF THE INVENTION

In one broad form, the present invention provides a load carrier for use on the roof of a vehicle, the load carrier comprising:

a flexible member adapted to be placed, in use, on the roof of the vehicle and having at least one inflatable tubular portion extending transversely across the roof of the vehicle, a pair of securing members connected to respective opposite ends of the flexible member, and each having connection means such that the securing members can be releasably joined to each other, the joined securing members extending, in use, from one end of the flexible member, under the vehicle roof, and to the opposite end of the flexible member.

Preferably, the flexible member comprises a pair of parallel inflatable tubular portions juxtaposed on either side of a central strip.

Anchorage elements may be provided at spaced locations along the strip to define anchors for straps, ropes or the like used to secure the load to the carrier. The anchorage elements may be in the form of eyelets, loops or similar fittings.

The opposite ends of the flexible member may be provided with flaps which are captured between the vehicle doors and the roof, thereby holding the flexible member fast to the roof.

The securing members may suitably be lengths of webbing, straps, ropes or similar thin elongated securing lines. The securing members may be connected to the opposite ends of the central strip.

The connection means at the free ends of the securing members may suitably be snap-fit buckles, hook and loop fasteners such as those sold under the trade mark VELCRO, or any other suitable connectors.

Each inflatable portion may suitably be inflated by mouth through a check valve provided in a valve stem on the tubular portion. The check valve can be opened, e.g. by squeezing the sides of the valve stem, to allow the tubular portion to be deflated for stowing.

Typically, two load carriers are used for each vehicle, being disposed in use, at the fore and aft ends of the relatively flat portion of the roof so as to permit the carrying of long loads such as surfboards, ladders and the like.

Although the dimensions of the inflatable portions of the carrier are not critical, it is desirable that each portion extend to within approximately 100 mm from one lateral extremity of the roof to the other, thereby allowing for one set of carriers to fit a large group of cars.

To install a carrier, it is laid across the vehicle roof at the desired position on the roof and the adjacent doors opened. The ends of the securing members are then pulled into the vehicle from opposite sides, and the ends are joined or fastened together and pulled tight.

When the doors are closed the webbing or end flaps are pulled inwards to follow the contour of the door at that position thereby firmly holding the carrier to the vehicle body. Final securing may involve retensioning of the securing members within the vehicle cabin.

Two spaced carriers are usually placed on the roof. The inflatable portions are inflated, or partially inflated to the desired amount, and the load is then placed on the spaced carriers to span same. The load is secured to the carrier by tie-down ropes or straps connected to the anchor eyelets.

The tubes may be further inflated if desired. A relief valve may be fitted to all tubes if desired.

The inflatable load carrier of this invention provides a cushioning support which prevents load damage to the roof of a vehicle, and which spreads the load on the roof evenly as the inflatable portion always has the same pressure throughout its body, irrespective of load.

In order that the invention may be more readily understood and put into practical effect, reference will now be made to the accompanying drawings which illustrate a preferred embodiment of the invention. Other advantages of the invention will be apparent from the following description.

BRIEF DESCRIPTION OF THE DRAWINGS

FIG. 1 illustrates a carrier according to one embodiment of the invention in a deflated flat form;

FIG. 2 illustrates the carrier of FIG. 1 in inflated condition;

FIG. 3 is a cross sectional view along line A—A of FIG. 2;

DESCRIPTION OF THE PREFERRED EMBODIMENT

Figure 4:
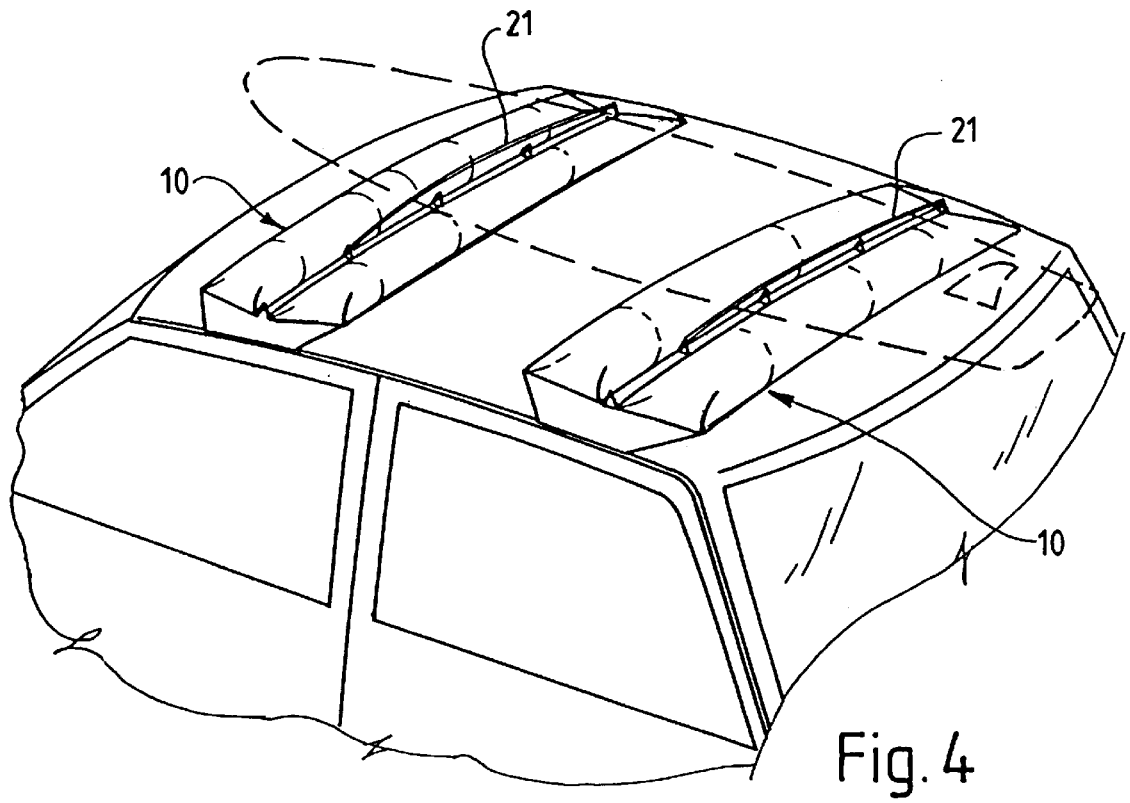
FIG. 4 illustrates the application of the carrier to a roof of a vehicle.
Figure 5:
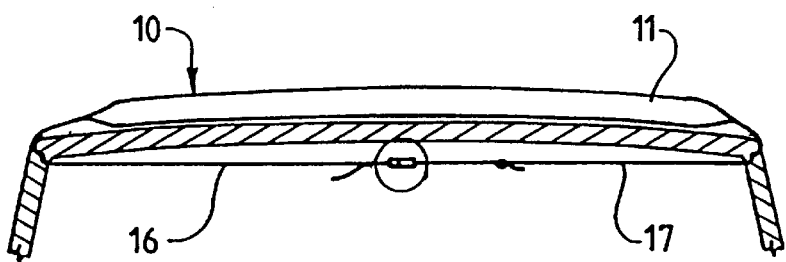
FIG. 5 illustrates a cross section of part of the vehicle showing the manner in which the carrier is secured in position.
Figure 5A:
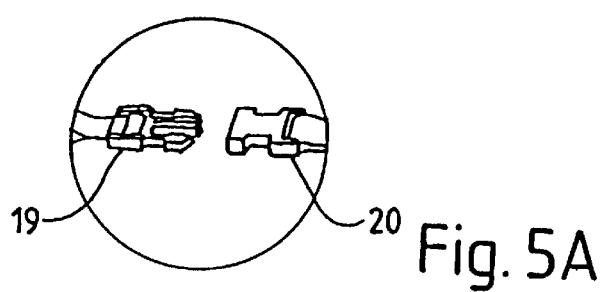
FIG. 5A is an enlargement of the circled portion in FIG. 5.

The load carrier of the embodiment illustrated in FIGS. 1 to 3 comprises a flat flexible member 10 having a pair of inflatable tubular portions 11 extending substantially parallel to each other on either side of a central non-inflatable strip 12. The flexible member 10 can be formed, for example, by laying two impermeable sheets or panels of plastic or rubberised woven material, one on top of the other, and welding the two sheets or panels together along rectangular paths to form sealed tubular portions 11.

A valve 13 is provided on each tube 11 to permit it to be inflated, typically by mouth. Each valve 13 is located in a valve stem protruding from its tube 11 and defining an inflating nozzle.

The opposite ends of the flexible member 10 terminate in triangular flaps 14, 15. A pair of securing members, such as webbing or straps 16, 17, have their ends connected to opposite ends of the flexible member 10. Typically, the straps 16, 17 are connected to the triangular flaps 14, 15, respectively. (The straps 16, 17 may each constitute a part of a continuous strap which may be fixed, e.g. by sewing, from one flap 14, along the central strip 12, to the other flap 15. Although the strap is connected along its length to the flaps 14, 15 and central strip 12, it may be considered as a pair of straps 16, 17 connected to the flaps 14, 15).

Anchor elements 18 are provided along the central strip 12 at spaced locations. Typically, the anchor elements are triangular loops 18 which are sewn in place on the strap fixed to the central strip 12. However, any other suitable form of anchoring element may be placed along the central strip 12.

Mating connectors 19, 20 are provided at the ends of straps 16, 17. In the preferred embodiment, the mating connectors are male and female releasable snap-in fasteners. However, any other form of connector may be used, such as complementary hook and loop material sold under the trade mark VELCRO.

Preferably, the lengths of straps 16, 17 are adjustable, e.g. by having adjustable connections to the mating connectors 19, 20.

As shown in FIG. 3, when the tubes 11 are inflated, they adopt a generally oval configuration in cross section. The cross section may change depending upon the air pressure in the tubes 11 and the load on the tubes 11.

Typically, two carriers are used for carrying a load on a vehicle. As each carrier is made of flexible plastic material, it can be furled into compact form and stored in, say, the vehicle glove box, when not in use.

When the carriers are to be used, they are unfurled and positioned in an uninflated state at a suitable spacing on the vehicle roof, extending transversely across the roof, as shown in FIG. 4. The tubular portions 11 may be partially inflated by mouth, or by air pump. The vehicle doors are opened and the straps 16, 17 are drawn into the vehicle cabin where the connectors 19, 20 are joined under the car roof.

When the straps 16, 17 are drawn around the sides of the roof and into the vehicle interior, the flaps 14, 15 locate between the upper door frame and the vehicle roof. When the doors are closed, the flaps 14, 15 are captured between the doors and the car roof. Moreover, due to the curved profile of the door frame, the flexible member 10 is slightly tensioned across the roof of the vehicle when the end flaps 14, 15 are sandwiched between their respective doors and the car roof. The joined straps 16, 17 may be retensioned, e.g. by pulling on one or both of the loose ends of the straps passing through buckles 19, 20.

The straps 16, 17 of the forward carrier may be looped around the stem of the rear view mirror within the vehicle so as not to interfere with vision through the windscreen.

The inflatable portions 11 can be further inflated to the desired degree, and the load is then placed on the carriers as shown in FIG. 4.

Resilient straps 21 may be used to tie down the load to the carriers, by connecting the ends of the tie-down straps to the anchor loops 18.

When the carriers are no longer required, they may be removed simply by opening car doors, disconnecting the connectors 19, 20 and removing the carriers from the car roof. The tubular portions can then be deflated to enable the carriers to be rolled up and stored in a compact form, e.g. in the car boot or in the glovebox.

Alternatively, due to the lightweight nature of the carriers, they may even remain tied to the load and lifted off with the load if it is to be reloaded later (e.g. a canoe).

In situations where the vehicle does not have rear doors, connecting webbing (not shown) may be provided between the front and rear carriers to locate the rear carrier relative to the front anchored carrier. The straps 16, 17 of the rear carrier may then be secured to the vehicle rear hatch or boot or to the rear wheel arches, for example by clips.

The abovedescribed load carrier has several advantages over known carriers, including

- the deflated load carrier can be furled into a compact form when not in use, and easily stowed,
- the inflatable carrier is lightweight and of economic construction,
- the inflatable carrier can be mounted and removed quickly and easily, without any damage to the vehicle roof,
- as the straps are connected within the vehicle, the doors may be locked to make the carrier theft resistant,
- the carrier is suitable for use on modern vehicles which do not have rain gutters,
- the inflatable carrier can be used to carry fragile loads such as glass sheets,
- the carrier may be partially inflated to suit the particular load being carried,
- by using two juxtaposed tubes, the carrier is resistant to rolling during braking or fast acceleration, and the use of two tubes in each carrier ensures that one tube will still support the load if the other accidentally deflates.

It is preferred that each carrier has a pair of side by side inflatable tubes for stability and ease of mounting. However, each carrier may comprise a single inflatable tubular portion. Alternatively, the load carrier may comprise more than two inflatable tubular portions.

In an alternative embodiment, each inflatable portion may be defined by separated sections spaced apart transversely of the roof. In yet a further form, the inflatable portions may be defined by discrete inflatable chambers arranged at spaced positions transversely of the roof and secured together by suitable connection means.

Although the connection of the securing straps is preferably within the vehicle and in the middle of the vehicle, the securing straps may be of uneven length so that the connection is off centre, or even outside the vehicle (although the joined straps still pass through the interior of the vehicle). For example, a long strap may extend from one end of the flexible member, under the roof, and be connected to a connector at the opposite end of the flexible member.

The foregoing describes only some embodiments of the invention, and modifications which are obvious to those skilled in the art may be made thereto without departing from the scope of the invention as defined in the following claims.

I claim:

1. A load carrier for use on the roof of a vehicle, the load carrier comprising:

a flexible member adapted to be placed, in use, on the roof of the vehicle and having at least one inflatable tubular portion for extending transversely across the roof of the vehicle, elongate securing means connected at least to opposite ends of the flexible member, and able to be formed into a loop extending, in use, from one end of the flexible member, under the vehicle roof, and to the opposite end of the flexible member, and means for tensioning the loop around the vehicle roof, wherein the elongate securing means is a securing strap fixed to the flexible member alongside the tubular portion, and wherein the at least one inflatable tubular portion comprises a pair of parallel inflatable tubular portions respectively juxtaposed on opposing longitudinal sides of the securing strap.

2. A load carrier as claimed in claim 1, further comprising a plurality of anchorage elements at spaced locations along the securing strap.

3. A load carrier as claimed in claim 1, wherein the flexible member has non-inflatable flap portions at its opposite ends, the securing strap overlying the flap portions in use.

4. A load carrier as claimed in claim 2, wherein the anchorage elements are loops connected to the securing strap.

5. A load carrier as claimed in claim 1, wherein the tensioning means comprises fastening means for fastening end portions of the strap together, the fastening means being adjustable relative to at least one of the end portions to thereby tension the loop.

6. A load carrier as claimed in claim 5, wherein the strap is of such length and is so positioned relative to the flexible member that the end portions fasten together approximately under the middle of the vehicle roof.

7. A load carrier as claimed in claim 5, wherein the strap is of such length and is so positioned relative to the flexible member that the end portions fasten together outside the vehicle near one end of the tubular portion.

8. A load carrier for use on a roof of a car, the load carrier comprising a flexible planar member adapted to be placed, in use, on the roof of the car and having a pair of parallel inflatable tubular portions respectively juxtaposed on opposing longitudinal sides of a non-inflatable central strip, a securing strap fixed, intermediate its ends, along the central strip, the strap being of sufficient length to loop under the roof of the car, and an adjustable fastener for joining end portions of the securing strap to form a loop of adjustable size.

\* \* \* \* \*